United States Patent
Hadas et al.

(10) Patent No.: US 11,169,844 B2
(45) Date of Patent: Nov. 9, 2021

(54) VIRTUAL MACHINE MIGRATION TO MULTIPLE DESTINATION NODES

(71) Applicant: Red Hat, Inc., Raleigh, NC (US)

(72) Inventors: Arik Hadas, Raanana (IL); Edward Haas, Raanana (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/789,209

(22) Filed: Feb. 12, 2020

(65) Prior Publication Data
US 2021/0248000 A1 Aug. 12, 2021

(51) Int. Cl.
| | |
|---|---|
| *G06F 15/173* | (2006.01) |
| *G06F 9/48* | (2006.01) |
| *G06F 9/455* | (2018.01) |
| *H04L 29/08* | (2006.01) |
| *H04L 12/18* | (2006.01) |

(52) U.S. Cl.
CPC ........ *G06F 9/4856* (2013.01); *G06F 9/45558* (2013.01); *H04L 12/18* (2013.01); *H04L 67/148* (2013.01); *G06F 2009/4557* (2013.01); *G06F 2009/45595* (2013.01)

(58) Field of Classification Search
CPC .............. G06F 9/4856; G06F 9/45558; G06F 2009/4557; G06F 2009/45595; H04L 67/148; H04L 12/18
See application file for complete search history.

(56) References Cited

U.S. PATENT DOCUMENTS

| | | | |
|---|---|---|---|
| 8,312,318 B2 | 11/2012 | Graham et al. | |
| 2007/0180436 A1* | 8/2007 | Travostino | H04L 67/34 717/138 |
| 2015/0071091 A1 | 3/2015 | Govil et al. | |
| 2018/0139148 A1* | 5/2018 | Gamage | H04L 47/822 |
| 2018/0295064 A1* | 10/2018 | Movsisyan | H04L 45/70 |
| 2020/0117494 A1* | 4/2020 | Cortez | G06N 5/02 |

FOREIGN PATENT DOCUMENTS

CN 102082692 B 10/2012

OTHER PUBLICATIONS

Sun, Gang; A New Technique for Efficient Live Migration of Multiple Virtual Machines; Published 2016; https://www.researchgate.net/publication/283690968_A_new_technique_for_efficient_live_migration_of_multiple_virtual_machines.
Despande, Umesh; Traffic-Sensitive Live Migration of Virtual Machines http://www.nimbusproject.org/files/Deshpande_CCGrid15.pdf.
Clark, Christopher; Live Migration of Virtual Machines https://www.usenix.org/legacy/events/nsdi05/tech/full_papers/clark.pdf.
Farhat, Samir; Windows Server 2012 Hyper-V: Simultaneous Live Migration https://buildwindows.wordpress.com/2013/04/24/windows-server-2012-hyper-v-simultanous-live-migration/.

* cited by examiner

*Primary Examiner* — Anh Nguyen
(74) *Attorney, Agent, or Firm* — Haynes and Boone, LLP

(57) ABSTRACT

According to one example, a method includes determining that a first virtual machine on a source node is to be migrated, selecting a first plurality of destination nodes for the first virtual machine, and simultaneously migrating the first virtual machine to each of the first plurality of destination nodes. The method further includes, after the migrating has started and before the migrating has finished, selecting one of the first plurality of destination nodes as a designated node. The method further includes discontinuing the migrating to each of the first plurality of destination nodes except the designated node.

15 Claims, 4 Drawing Sheets

VIRTUAL MACHINE MIGRATION TO MULTIPLE DESTINATION NODES

BACKGROUND

The present disclosure relates generally to virtual machines, and more particularly, to virtual machine migration.

Virtualization is technology that allows multiple simulated environments or dedicated resources to be created from a single, physical hardware system. Software called a hypervisor connects directly to that hardware and allows a system to be split into separate, distinct, and secure environments known as virtual machines (VMs). These VMs rely on the hypervisor's ability to separate the machine's resources from the hardware and distribute them appropriately.

The physical hardware, equipped with a hypervisor, is called the host, while the many VMs that use its resources are guests. These guests treat computing resources—like CPU, memory, and storage—as a pool of resources that can easily be relocated. Operators can control virtual instances of CPU, memory, storage, and other resources, so guests receive the resources they need when they need them.

SUMMARY

According to one example, a method includes, with a source node, determining that a plurality of virtual machines running on the source node are to be migrated. The method further includes, for each of the plurality of virtual machines determining a plurality of destination nodes. The method further includes, for one of the plurality of virtual machines, simultaneously migrating the one of the plurality of virtual machines to each of the plurality of destination nodes for the one of the plurality of virtual machines. The method further includes, after the migrating has started and before migration to one of the destination nodes is complete, selecting one of the plurality of destination nodes for the one of the plurality of virtual machines. The method further includes, in response to the selecting, discontinuing migration to other ones of the plurality of destination nodes for the one of the plurality of virtual machines.

According to one example, a method includes determining that a first virtual machine on a source node is to be migrated, selecting a first plurality of destination nodes for the first virtual machine, and simultaneously migrating the first virtual machine to each of the first plurality of destination nodes. The method further includes, after the migrating has started and before the migrating has finished, selecting one of the first plurality of destination nodes as a designated node. The method further includes discontinuing the migrating to each of the first plurality of destination nodes except the designated node.

According to one example, a computing system includes a processor and a memory comprising machine readable instructions that when executed by the processor, cause the system to determine that a first virtual machine on a source node should be migrated and select a first plurality of destination nodes for the first virtual machine. The system is further to simultaneously migrate the first virtual machine to each of the first plurality of destination nodes. The system is further to, after the migrating has started and before the migrating has finished, select one of the first plurality of destination nodes as a designated node. The system is further to discontinue the migrating to each of the plurality of destination nodes except the designated node.

Figure 1:
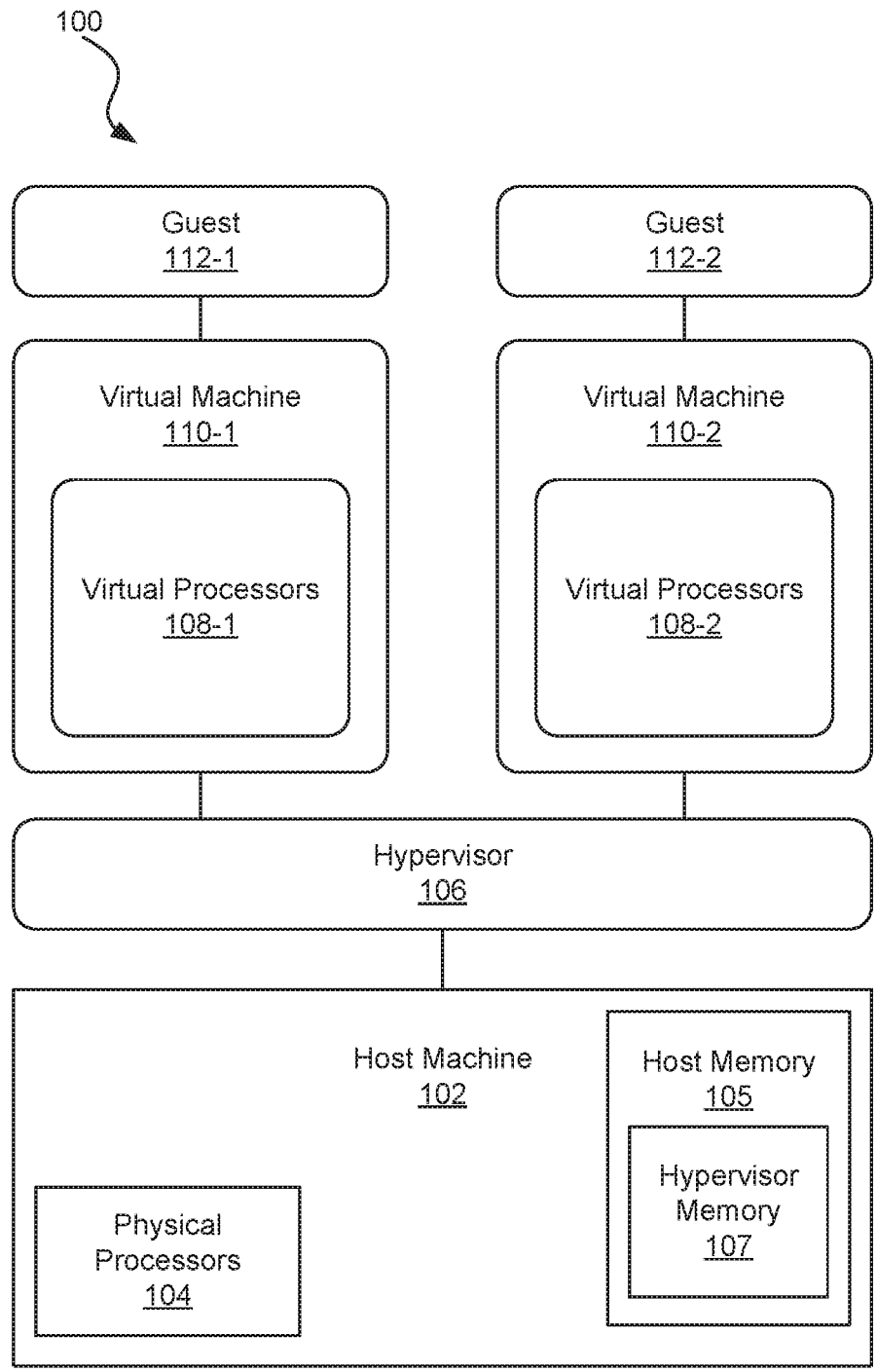
FIG. 1 is a diagram showing an illustrative host system running a plurality of virtual machines, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Migration is the process of moving a guest process (e.g., a virtual machine, a container, a package, or any other form of an executable process) from one host physical machine to another. This is possible because guest processes (e.g., virtual machines) are running in a virtualized environment instead of directly on the hardware. Migration may be useful in many scenarios. For example, migration may be used for load balancing. In load balancing, guest processes (e.g., virtual machines) are moved to host physical machines with lower usage when their host physical machine becomes overloaded, or another host physical machine is under-utilized. Migration may also be used to achieve hardware independence. For example, when upgrading, adding, or removing hardware devices on the host physical machine, guest processes (e.g., virtual machines) may be safely relocated to other host physical machines. This means that guest processes (e.g., virtual machines) do not experience any downtime for hardware improvements. Further, migration may be used to achieve energy saving by redistributing guest processes (e.g., virtual machines) to other host physical machines and consolidating them at fewer host physical machines so that more host physical machines can remain powered off to save energy and cut costs, such as operating costs, in low usage periods. Migration may additionally be used to achieve network performance improvements, such as by moving guest virtual machines to other geographic locations to lower latency or provide improved access.

Migration works by sending the state of the guest process' (e.g., virtual machine's) memory and any virtualized devices to a destination host physical machine. In some examples, migration uses shared, networked storage to store the guest process' (e.g., virtual machine's) images that are to be migrated. In some examples, such networked storage pools are further managed by software which provides a single way to manage virtual machines and other virtualization functionality, such as storage and network interface management. In some examples, such software manages multiple different virtualization providers/hypervisors when migrating processes (e.g., virtual machines). For example, such software can be used to list the existing processes (e.g., virtual machines) for any supported process manager, virtualization provider, or hypervisor (KVM, Xen, VMWare ESX, etc.), without requiring a user to learn the specific tools or commands of each hypervisor.

For a host to be eligible to start a process or accept a migrated process from another host, the host must have enough free memory and CPUs to support the requirements of the guest process being started on or migrated to the host. If multiple hosts are eligible targets, one may be selected based on the load balancing policy for the cluster. For example, if an even distribution policy is in effect, the host with the lowest CPU utilization may be chosen. If a power saving policy is in effect, the host with the lowest CPU utilization between the maximum and minimum service levels may be selected. In some examples, if a host is responsible for managing a storage pool of a cluster, then such a host may be less preferred target host than another equivalent host which is not managing the storage pool. In some examples, the first process started in a cluster (e.g., by migration) will not run on the host managing the storage pool if the storage pool manager role is held by a host in that cluster.

In some cases, the most ideal target node for migration may change after migration has started. For example, while target A was the most ideal choice for migration when migration started, it may be that target A experiences a spike in resource utilization due to one of the other virtual machines or containers running on target A. Alternatively, there may be an issue with the network connection to target A or target A may fail. Thus, it may be the case, partway through migration, it is realized that target B would have been the best choice for migration. In some cases, migration may thus have to be restarted to target B, thus resulting in longer time to get the virtual machine migrated out of the source node. These types of scenarios become more common as host machines run various types of applications such as virtual machines and containers, which result in a much more dynamic environment.

To improve the virtual machine migration process, the principles described herein relate to a process by which virtual machines are migrated to multiple destinations simultaneously. During the migration, a virtual machine management module, such as a hypervisor, may monitor conditions such as network traffic and workload of destination nodes. Using this information, at some point before migration completes, the virtual machine management module may decide which of the multiple destination nodes will be the designated target node. At this point, migration to all other destination nodes may be discontinued.

Simultaneous migration to multiple destinations improves the migration process because it reduces the reliance on a single target. Thus, in a scenario where target A fails halfway through the migration, the migration process with not have to be restarted as one of the other targets (out of the multiple targets), to which migration is already in progress, can be selected as the ultimate target. This method of virtual machine migration to multiple destination nodes may be particularly beneficial in cases where the host systems utilize multiple different types of virtualization such as virtual machines and containers. Additionally, this method may be useful in situations where evacuation of a node (i.e., the migration of all virtual entities from the node) is more urgent.

FIG. 1 is a diagram showing an illustrative system 100 involving a plurality of virtual machines 110, each of which may be evacuated to another host system according to principles described herein. According to the present example, a physical system, such as a host machine 102 includes hardware such as a set of processors 104 and a memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 106 or for use by the virtual machines 110. Such designated blocks of memory are referred to as hypervisor memory 107. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors.

The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The virtual machines 110 may also include virtual network devices. Thus, when the guest 112 transmits or receives information from another entity, it does so through the virtual network device. The hypervisor 106 maps the virtual network devices associated with the virtual machines 110 to one of the physical network devices of the host machine 102. For example, the hypervisor 106 may map one virtual network device to one network device of the host machine and map a different virtual network device to either the same or a different network device of the host machine 102.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The network devices are used to transmit data to other computing devices. The network devices may be hardwire devices for transmitting data over Ethernet or fiber optic cables. Additionally, the network devices may include wireless devices that transmit data using radio waves or other wireless communication technologies.

FIG. 1 illustrates a single host system 102 with multiple virtual machines 110. Such a host system may often be placed within a datacenter with multiple, similar host systems. In some cases, it is desirable to migrate one of the virtual machines 110 to a different host system. This may be for load balancing purposes. Additionally, it may be the case that it is desirable to evacuate the host system 102. In an evacuation, every virtual entity is migrated to a different host system. This may be done for a variety of reasons. For example, the host machine 102 may have to undergo scheduled maintenance. Alternatively, it may be detected that the host machine may fail shortly and thus in order to keep the virtual machines 110 running, each of the virtual machines 110 is moved to a new host system.

Figure 2:
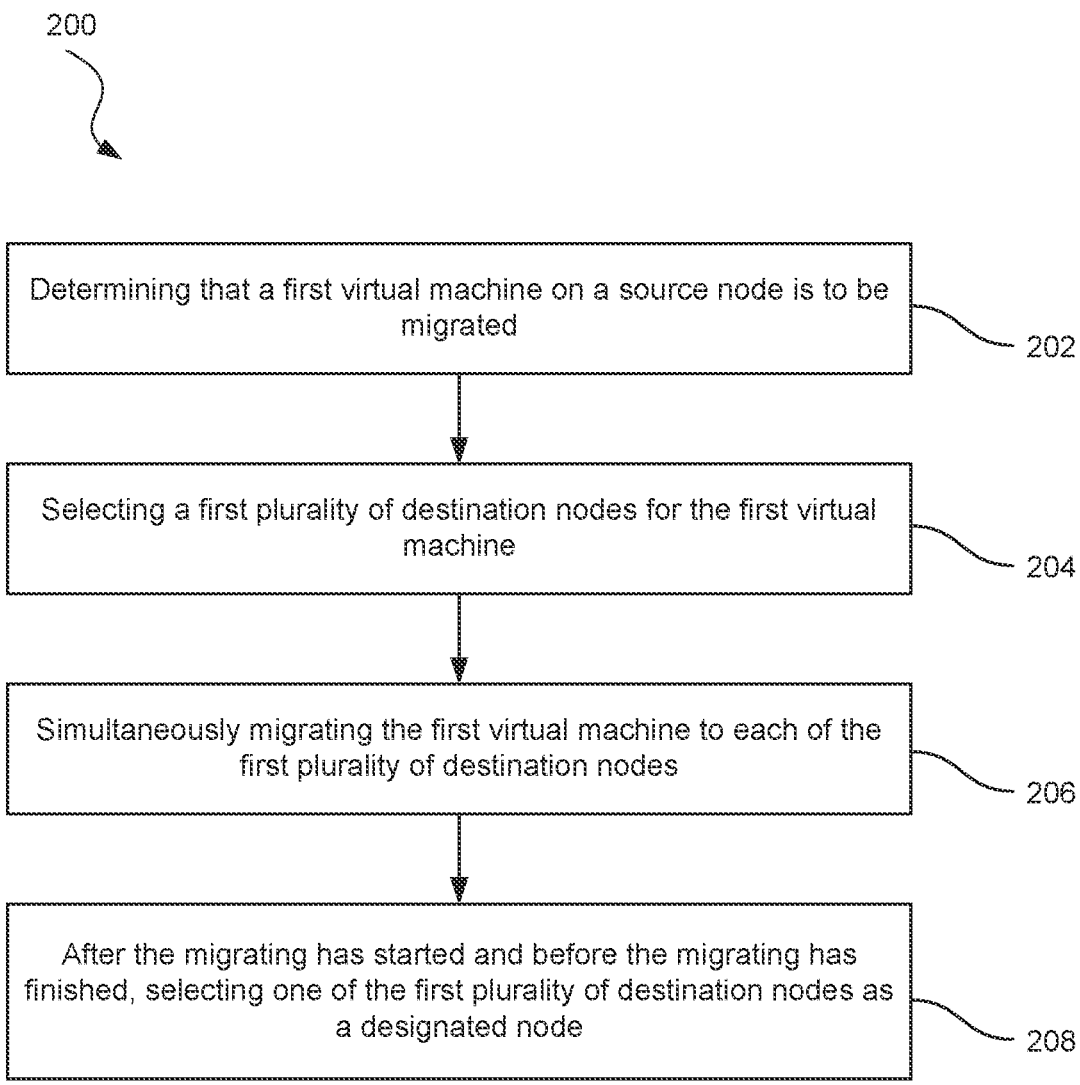
FIG. 2 is a flowchart showing an illustrative method for virtual machine migration to multiple destination nodes, according to one example of principles described herein.

FIG. 2 illustrates a method for migrating virtual machines to multiple destinations simultaneously. In some examples, the method may be performed at least in part by a virtual machine manager (sometimes referred to as a scheduler). The virtual machine manager manages the workload of multiple host systems within a cloud computing environment. The cloud computing environment may include one or more datacenters. The virtual machines and containers that make up the cloud computing environment may be migrated to various host systems by the virtual machine manager for workload balancing or to evacuate a particular host system.

The method 200 includes a process 202 for determining that a first virtual machine on a source node is to be migrated. This may be triggered in a variety of ways. For example, the virtual machine manager may determine that a particular host system (i.e., node) is to be evacuated and thus all virtual machines and containers on that node should be migrated to other nodes. The virtual machine manager may decide that a particular node is to be evacuated because it has determined that it may fail shortly. Alternatively, the virtual machine manager may determine that the node has upcoming scheduled maintenance. In some examples, the evacuation may be triggered manually by a system administrator. In some examples, a migration may be triggered by load balancing requirements. For example, the source node may be handling too many virtual machines relative to other nodes in the cloud computing environment. Thus, the virtual machine manager may cause the migration of a virtual machine.

The method 200 further includes a process 204 for selecting a first plurality of destination nodes for the first virtual machine. This may be done, for example, by the virtual machine manager. The virtual machine manager may also select other sets of destination nodes for the other virtual machines running on the source node. In some examples, the different sets of destination nodes may overlap, as will be described in further detail with the text accompanying FIG. 3A. In some examples, the different sets of destination nodes may be non-overlapping, as will be described in further detail with the text accompanying FIG. 3B.

The method further includes a step 206 for simultaneously migrating the first virtual machine to each of the first plurality of destination nodes. In other words, the data associated with the virtual machine (e.g., processor state, memory, application states) may be transmitted across the network from the source node to the appropriate destination nodes. This occurs simultaneously. In other words, the source node transmits the virtual machine data to each of the assigned destination nodes at the same time. In some examples, to reduce network traffic, the virtual machine data may be multicast to the assigned destination nodes, rather than sent to each destination node in a unicast manner.

The method 200 further includes a process 208 for, after the migrating has started and before the migrating has finished, selecting one of the first plurality of destination nodes as a designated node. The designated node is the destination node that will complete the migration and continue execution of the virtual machine. There may be many factors when determining which of the destination nodes for a particular virtual machine will be selected as the designated node, as will be described in further detail with the text accompanying FIG. 4. In general, the most ideal choice at a particular point during the migration process will be selected as the designated node.

The method 200 further includes a process for discontinuing the migrating to each of the first plurality of destination nodes except the designated node. In other words, migration to any node other than the designated node is stopped. Any resources allocated by those other destination nodes may then be freed for use with other processes. For example, the memory storage space allocated to receive the virtual machine may be freed.

In some examples, when evacuating a node some of the virtual machines may be migrated using the multi-destination technique described above and some virtual machines may be migrated directly to a single destination. For example, if a particular virtual machine is very large and consumes a lot of memory space, it may not be worth transmitting that virtual machine to multiple destinations. Thus, that virtual machine may be migrated directly to a single destination while other, smaller virtual machines use the multi-destination technique described above.

Figure 3A:
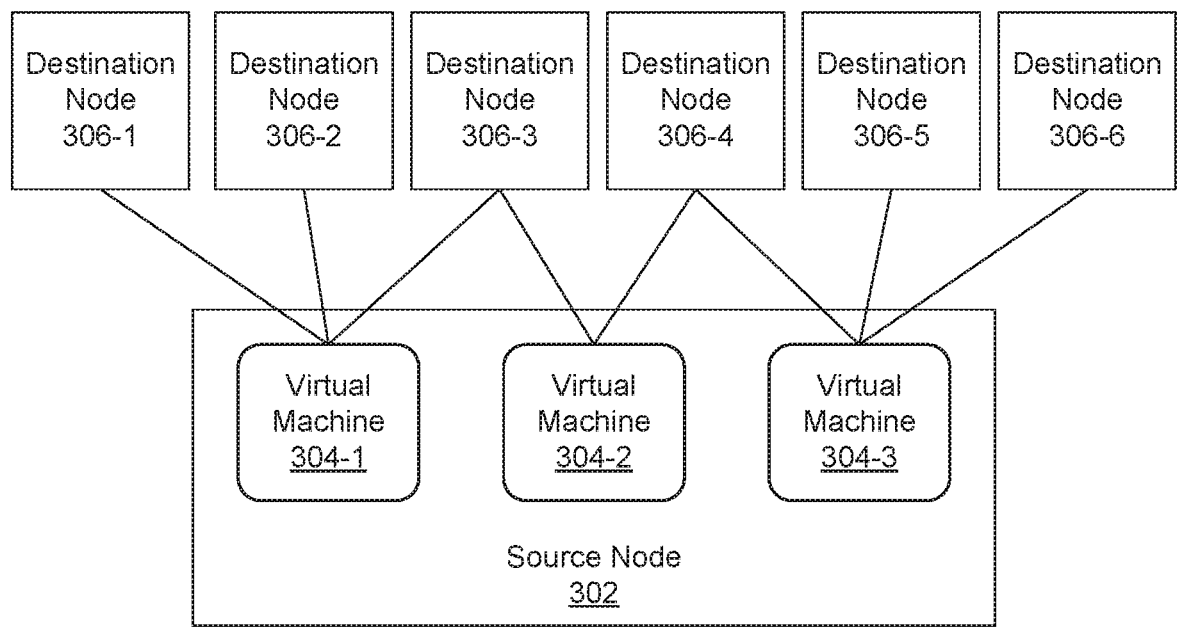
FIG. 3A is a diagram showing virtual machine migration to multiple destination nodes with overlapping destination sets, according to one example of principles described herein.

FIG. 3A is a diagram showing virtual machine migration to multiple destination nodes with overlapping destination sets. According to the present example, a source node 302 includes a plurality of virtual machines 304-1, 304-2, 304-3. The source node 302 may correspond to the host system 102 of FIG. 1. The source node 302 may be one of several nodes within a datacenter or cloud computing environment. Other nodes within such environment may include the destination nodes 306-1, 306-2, 306-3, 306-4, 306-5, 306-6. As mentioned above, virtual machines are able to be migrated to multiple, different host systems. The migration of virtual machines within a cloud computing environment may be managed by a scheduler or virtual machine manager. The scheduler may monitor various properties of the host systems and network systems that connect the hosts to each other.

For each of the virtual machines 304-1, 304-2, 304-3, the scheduler may assign a set of destination nodes to which the virtual machines will be migrated. In the present example, the scheduler assigns virtual machine 304-1 to destination nodes 306-1, 306-2, and 306-3. This means that when migration of virtual machine 304-1 begins, it happens simultaneously to each of its assigned destination nodes. The scheduler also assigns virtual machine 304-2 to destination nodes 306-3 and 306-4. The scheduler further assigns virtual machine 304-3 to destination nodes 306-4, 306-5, and 306-6.

In some examples, the number of destination nodes assigned to a particular virtual machine may be based on the characteristics of that virtual machine. For example, a virtual machine that consumes more resources (e.g., memory space) may be assigned fewer destination nodes. Conversely, a virtual machine that consumes less resources may be assigned a larger number of destination nodes. By having virtual machines with larger amounts of resources be migrated to fewer destinations, less resources within the datacenter are consumed.

Figure 3B:
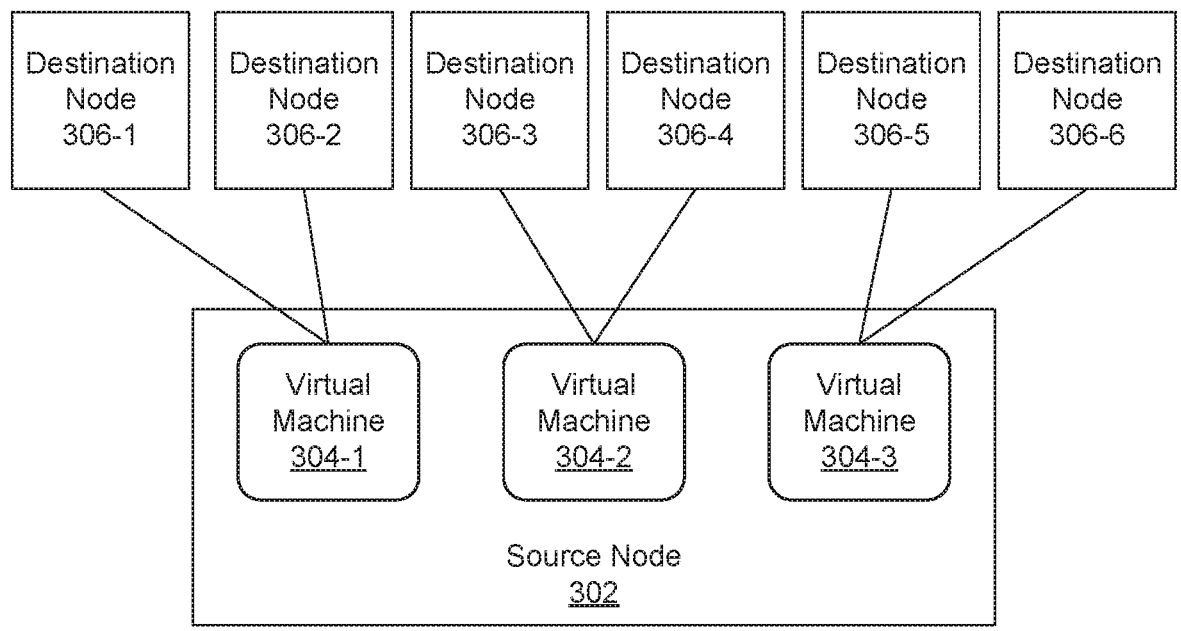
FIG. 3B is a diagram showing virtual machine migration to multiple destination nodes with non-overlapping sets, according to one example of principles described herein.

FIG. 3B is a diagram showing virtual machine migration to multiple destination nodes with non-overlapping sets. As shown in the figure, the virtual machines 304-1, 304-2, 304-3 are each assigned non-overlapping sets of destination nodes 306. Specifically, virtual machine 304-1 is assigned to destination nodes 306-1 and 306-2. Virtual machine 304-2 is assigned to destination nodes 306-3 and 306-4. Virtual machine 304-3 is assigned to destination nodes 306-5 and 306-6.

Figure 4:
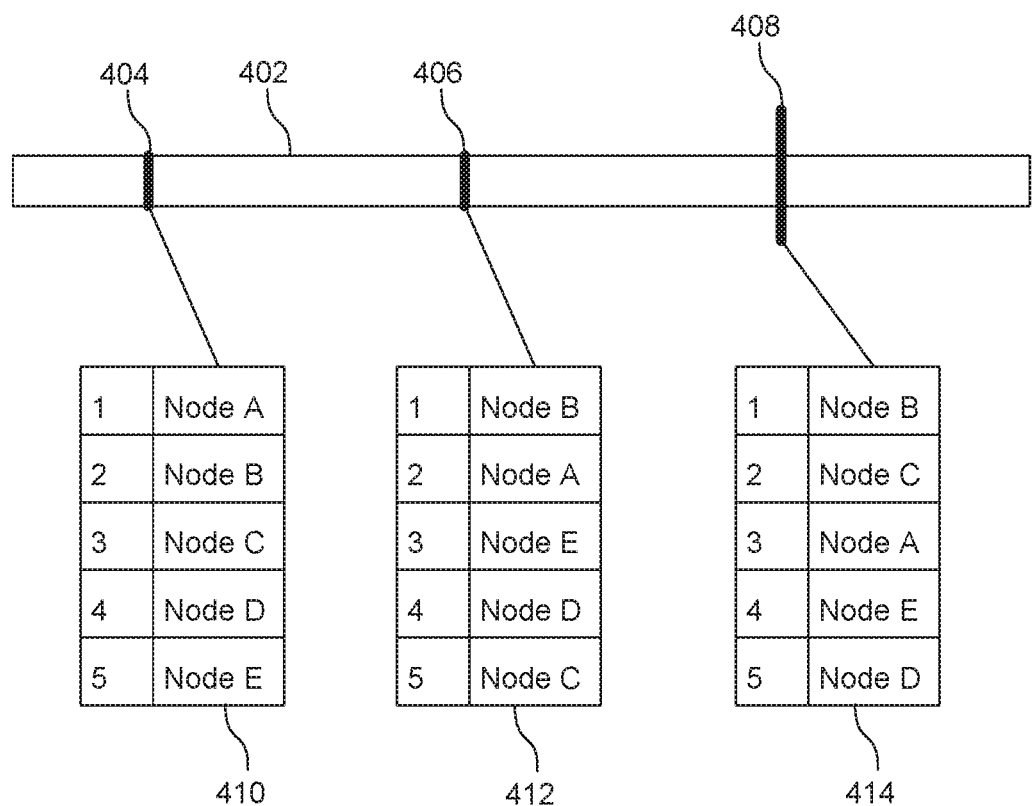
FIG. 4 is a diagram showing an illustrative ranking of destination nodes, according to one example of principles described herein.

FIG. 4 is a diagram showing an illustrative ranking of destination nodes. According to the present example, for each virtual machine being migrated from the source node, the virtual machine manager may select a number of eligible destination nodes. The virtual machine manager may also rank the destination nodes in the set by most favorable. FIG. 4 illustrates a migration timeline 402 as well as various rankings 410, 412, 414 of destination nodes at various points 404, 406, 408 along that timeline.

The virtual machine manager may determine destination node eligibility based on minimum required available computing and networking resources to receive the migrated virtual machine, such as CPU (computer processing unit), memory, local disk, remote disk, and network resources. CPU resources may refer to processor type, clock speed, cores, threads, CPU cycles, or other indications of computer processing power. For example, a target host CPU running at 3.0 gigahertz with four available CPU cores would be eligible to host a process requiring a minimum clock speed of 1.8 gigahertz, and a maximum of two cores or a minimum of one core. Memory resources may refer to an amount of available free memory, memory access time, memory timing, or other indications of memory performance, usage or availability. For example, a target host with 16 gigabytes of free memory would be eligible to host a process requiring a recommended 4 gigabytes of free memory, with maximum and minimum memory usage (e.g., based on historical measurements) between 8 gigabytes and 0.5 gigabytes of free memory. Local disk may refer to an amount of local disk space available, input/output operations per second (TOPS), local disk access time, local disk seek time, or other indications of local disk availability, performance, or usage. For example, a target host with 1 terabyte of local disk space would be eligible to host a process requiring 128 megabytes of disk space. Remote disk may refer to an amount of available network or cloud storage, input/output operations per second (TOPS), remote disk access time, remote disk seek time, remote disk latency, or other indications of remote disk availability, performance, or usage. For example, a target host with 100 terabytes of network or cloud storage would be eligible to host a process requiring 1 terabyte of disk space. Network resources may refer to a network connection type, bandwidth, average path distance, latency, or other indications of network availability or usage. For example, a target host with a T5 connection, offering 400 megabits per second (Mbps) of bandwidth, located 5 hops from the source host, and having 3 milliseconds of latency, would be eligible to host a process requiring a minimum of a T1 connection, 1.5 Mbps bandwidth, an average path distance of 10 hops, and 100 milliseconds of latency. Other parameters and qualifiers (other than minimum, average, maximum) may also be used to determine if a host is eligible to host a process. In some examples, eligibility may be determined based on passing or failing the requirements of a single parameter or a plurality of parameters (e.g., a filter). In some examples, eligibility may be determined based on a totality of parameters, such that even if the requirements of one or more parameters are not met, but other parameters are met or exceeded, the net result may be an eligible host (e.g., a net score).

The virtual machine manager may also assign priority scores to eligible destination hosts based on real-time conditions. The priority score may be affected by a variety of factors. One such factor may be the resource utilization of the destination host. For example, a destination host at 20% capacity may be a higher priority than a destination host at 90% capacity. The priority score may also be affected by network utilization. For example, the priority score to a destination host with a smaller ping time from the source host may be higher than to a destination host with a longer ping time.

For example, all else being equal, the migration of processes from a source host to an eligible destination host that is in the same location as the source host may be prioritized over a similar migration to target hosts in a different host location (e.g., different datacenter). If no eligible target hosts in the same host location as the source host exist, then eligible target host in the same data center location as the source host may be prioritized, and if none, then an eligible destination host in the same cluster location may be prioritized. For example, if the source host is located in Raleigh, N.C., is part of the North Carolina data center, and belongs to the Southern cluster, then target hosts located in the same host location (e.g., Raleigh) may receive a better score than target hosts located elsewhere (e.g., Charlotte) in the North Carolina data center, and target hosts in the North Carolina data center may receive a better score than target hosts located elsewhere (e.g., South Carolina) in the Southern cluster. While the locations here are described physically (geographically), locations may also be described virtually by using network identifiers and addresses, such as IP addresses, domains, subnets, etc. In some examples, the overall migration score may be determined by summing each sub-score, e.g., a network utilization score, a destination resource utilization score, and a location score. Other parameters and scoring systems may be used to determine an overall migration score. In some examples, the best migration score has the highest migration priority.

In the example of FIG. 4, at timepoint 404, the ranking 410 of eligible destination nodes for a particular virtual machine is shown. However, as time progresses, this ranking may change. For example, it may be the case that the transfer of data to node A is taking longer than expected and thus the transfer of data is proceeding relatively slowly compared to node B. Thus, node B may overtake node A in priority as shown in timepoint 406.

Timepoint 408 represents the time at which the virtual machine manager determines that the highest ranked target node (in this example, node B) will be the designated node. Timepoint 408 occurs after migration has started but before migration completes to one of the designated target nodes. This timepoint 408 may be determined in a variety of manners. In one example, the timepoint 408 may be when one of the target nodes completes the transfer of data from the source node. At this point, the migration process can be finalized by pausing the virtual machine on the source node and sending the final portions of data (e.g., processor state, recent changes to memory, etc.) to the target node. The migration process to all other target nodes may then be discontinued.

In some examples, timepoint 408 may be triggered when one of the destination nodes reaches a particular threshold point through the transfer. For example, when one node reaches 70% of the transfer, the virtual machine manager may consider that factor (as well as others) and make a decision as to which node will be the designated target node. While the designated target node may often be the node that reaches the threshold point first, it may also be the case that another node will be the designated target node based on other factors, such as resource utilization on the target node.

By using principles described herein, datacenters and cloud computing environments will be able to operate more efficiently. In particular, migration of virtual machines or other processes from one node to another will be able to be carried out with less risk of increased downtime. By sending the virtual machine to multiple nodes simultaneously, migration does not have to be restarted when a destination node fails or becomes otherwise ineligible as a destination node during migration. Rather, migration can then proceed to one of the other nodes to which the migration has started.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:

with a source node, determining that a plurality of virtual machines running on the source node are to be migrated;

for each of the plurality of virtual machines determining a plurality of destination nodes, wherein each of the plurality of virtual machines has partially overlapping the plurality of destination nodes;

for one of the plurality of virtual machines, simultaneously migrating the one of the plurality of virtual machines to each of the plurality of destination nodes for the one of the plurality of virtual machines, wherein simultaneously migrating the one of the plurality of virtual machines comprises multicasting data associated with the migration to each of the plurality of destination nodes for the one of the plurality of virtual machines;

after the migrating has started and before migration to one of the destination nodes is complete, selecting one of the plurality of destination nodes for the one of the plurality of virtual machines; and in response to the selecting, discontinuing migration to other ones of the plurality of destination nodes for the one of the plurality of virtual machines.

2. The method of claim 1, wherein each of the plurality of virtual machines is assigned non-overlapping sets of destination nodes.

3. The method of claim 1, wherein selecting one of the plurality of destination nodes for the one of the plurality of virtual machines is in response to predefined criteria.

4. The method of claim 1, wherein selecting one of the plurality of destination nodes for the one of the plurality of virtual machines is based on real-time conditions.

5. The method of claim 4, wherein the real-time conditions include network congestion or destination node workload.

6. The method of claim 1, wherein the determining that the plurality of virtual machines running on the source node are to be migrated is in response to determining that the source node will fail.

7. A method comprising:
    determining that a first virtual machine on a source node is to be migrated;
    selecting a first plurality of destination nodes for the first virtual machine, wherein each the first plurality of destination nodes overlap with a second plurality of destination nodes for a second virtual machine;
    simultaneously migrating the first virtual machine to each of the first plurality of destination nodes, wherein simultaneously migrating the first virtual machine comprises multicasting data associated with the migration to each of the plurality of destination nodes for the first virtual machine;
    after the migrating has started and before the migrating has finished, selecting one of the first plurality of destination nodes as a designated node; and
    discontinuing the migrating to each of the first plurality of destination nodes except the designated node.

8. The method of claim 7, further comprising, determining that the second virtual machine on the source node is to be migrated.

9. The method of claim 8, further comprising, selecting the second plurality of destination nodes for the second virtual machine.

10. The method of claim 9, wherein migrating the first virtual machine is done simultaneously with migrating the second virtual machine.

11. The method of claim 7, further comprising, ranking each of the plurality of destination nodes based on predefined criteria.

12. The method of claim 11, wherein selecting one of the plurality of destination nodes as a designated node is done by selecting a highest ranked of the plurality of destination nodes at a predefined point in time during migration.

13. A computing system comprising:
    a processor; and
    a memory comprising machine readable instructions that when executed by the processor, cause the system to:
    determine that a first virtual machine on a source node should be migrated;
    select a first plurality of destination nodes for the first virtual machine, wherein each the first plurality of destination nodes overlap with a second plurality of destination nodes for a second virtual machine;
    simultaneously migrate the first virtual machine to each of the first plurality of destination nodes, wherein to simultaneously migrate the first virtual machine comprises multicasting data associated with the migration to each of the plurality of destination nodes for the first virtual machine;
    after the migrating has started and before the migrating has finished, select one of the first plurality of destination nodes as a designated node; and
    discontinue the migrating to each of the plurality of destination nodes except the designated node.

14. The system of claim 13, wherein the system is further to determine that the second virtual machine on the source node is to be migrated.

15. The system of claim 14, wherein the system is further to select the second plurality of destination nodes for the second virtual machine.

* * * * *